United States Patent
Ryoo

(10) Patent No.: US 12,548,814 B2
(45) Date of Patent: Feb. 10, 2026

(54) ECO-FRIENDLY METHOD FOR REGENERATING CATHODE ACTIVE MATERIAL OF WASTE SECONDARY BATTERY USING LACTIC ACID

(71) Applicant: Andong National University Industry-Academic Cooperation Foundation, Andong-si (KR)

(72) Inventor: Keon Sang Ryoo, Andong-si (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 511 days.

(21) Appl. No.: 18/172,453

(22) Filed: Feb. 22, 2023

(65) Prior Publication Data

US 2023/0275280 A1    Aug. 31, 2023

(30) Foreign Application Priority Data

Feb. 25, 2022   (KR) .................. 10-2022-0025183

(51) Int. Cl.
*H01M 10/00* (2006.01)
*H01M 4/04* (2006.01)
*H01M 10/54* (2006.01)
*H01M 4/02* (2006.01)

(52) U.S. Cl.
CPC ......... *H01M 10/54* (2013.01); *H01M 4/0471* (2013.01); *H01M 2004/028* (2013.01)

(58) Field of Classification Search
CPC .......... H01M 10/54; H01M 4/04; Y02E 60/10
See application file for complete search history.

(56) References Cited

FOREIGN PATENT DOCUMENTS

| | | | | |
|---|---|---|---|---|
| CN | 112194201 A | * | 1/2021 | ........ H01M 10/0525 |
| KR | 10-2019-0123524 A | | 11/2019 | |
| TW | 202137609 A | * | 10/2021 | |
| WO | WO-2014042136 A1 | * | 3/2014 | ............... B09B 3/35 |

OTHER PUBLICATIONS

Zhangi et al., A method for recycling valuable metal of waste lithium ion battery and regenerating ternary positive electrode material Jan. 2021. See the Abstract. (Year: 2021).*
Saeki et al., Method for Recycling Lithium-Ion Batteries and Device Therefor, Mar. 2014. See the Abstract. (Year: 2014).*
Ho et al., Cathode and Cathode Slurry for Secondary Battery, 0-2021. See the Abstract. (Year: 2021).*

* cited by examiner

*Primary Examiner* — Tiffany Legette
*Assistant Examiner* — Monique M Wills
(74) *Attorney, Agent, or Firm* — You & IP, LLC

(57) ABSTRACT

Proposed is a method for regenerating a cathode active material of a waste secondary battery, the method includes (a) dissolving the metal component included in the waste cathode active material including 50% to 90% weight of manganese (Mn) based on the total weight of the metal component including lithium (Li), cobalt (Co), manganese (Mn), and nickel (Ni) in lactic acid and filtering to obtain a filtrate from which a solid is removed, (b) manufacturing a filtrate having a predetermined metal molar ratio by removing excess metal based on a predetermined metal molar ratio from the filtrate and adding an insufficient metal based on the predetermined metal molar ratio to the filtrate, and (c) synthesizing a cathode active material by removing solvent and lactic acid from the filtrate having a predetermined metal molar ratio and calcining.

6 Claims, 2 Drawing Sheets

ECO-FRIENDLY METHOD FOR REGENERATING CATHODE ACTIVE MATERIAL OF WASTE SECONDARY BATTERY USING LACTIC ACID

CROSS REFERENCE TO RELATED APPLICATION

The present application claims priority to Korean Patent Application No. 10-2022-0025183, filed Feb. 25, 2022, the entire contents of which is incorporated herein for all purposes by this reference.

STATEMENT REGARDING GOVERNMENT SPONSORED RESEARCH

This invention was made with Korean government support under "Basic Research Support Project for Individuals in Science and Engineering-Basic Research" awarded by Ministry of Science and ICT, and National Research Foundation of Korea.

BACKGROUND OF THE INVENTION

Field of the Invention

The present disclosure relates to a method for regenerating a cathode active material recovered from a waste secondary battery. More particularly, the present disclosure relates to a method for regenerating cathode active materials for waste secondary batteries that do not use strong acids such as sulfuric acid in the regeneration process, do not generate wastewater, and simplify the regeneration process.

Description of the Related Art

A lithium-ion battery is a secondary battery composed of a positive electrode, a negative electrode, an electrolyte solution, and a separator, and such batteries are discarded when the useful life thereof is reduced due to long-term charging and discharging. At the time of disposal, the cathode has an active material involved in the electrode reaction of a battery, and the active material and the conductive material are coated on a thin surface of an aluminum substrate. This active material is called a cathode active material, and since a large number of active metals such as lithium, cobalt, nickel, and manganese are included in the active material, it is recovered and recycled when discarded. The capacity and voltage of a battery are determined by the cathode active material, and when a large amount of lithium is included, the capacity increases. The general layered structure of lithium is synthesized and used in the form of LMO (Li—MnO) and LCO (Li—Co—O). Recently, there has been a tendency to use a lot of Ni-rich cathode materials by reducing the content of manganese and increasing the content of nickel. In the past, secondary batteries manufactured by increasing the amount of inexpensive manganese used have recently been developed to reduce the content of manganese and increase the content of lithium, cobalt, and nickel to improve their performance relatively.

As secondary batteries for automobiles, which were manufactured in large quantities in the past, are discarded in large quantities, many environmental problems are currently occurring due to such waste secondary batteries. In particular, since the cathode active material of waste secondary batteries has high added value when recycled, the cathode active material of waste secondary batteries is regenerated by melting the waste secondary batteries in strong acid. As such, environmentally harmful substances are used in the regeneration process, and the health hazards of workers and the environmental charges of regeneration companies are increasing due to the generation of toxic wastewater and heavy metal scattering dust.

Most of the recently discarded waste cathode active materials consist of lithium, cobalt, nickel, and manganese, and particularly, have a high content of manganese. Metals with high added value are lithium, cobalt, and nickel, and manganese has relatively low added value. Recently, there is a trend to lower the content of manganese and increase the content of other effective metals in order to enhance various performances and functions of secondary batteries. Thus, there is a need for a technology capable of selectively reducing and regenerating only high-concentration manganese from cathode active materials in secondary batteries that have recently been discarded. In addition, there is a need for a method of replacing dangerous sulfuric acid with an environmentally friendly organic acid and a technique capable of reducing the amount of sodium hydroxide used for pH control. In addition, a technology that can regenerate the cathode active material by simplifying the process without generating wastewater in the entire process is also required.

In the conventionally known technology, in order to recover only the cathode active material coated on the aluminum thin film, after pulverization, the pulverized aluminum thin film pieces and powdered cathode active material are sorted through sieving. When aluminum is finely pulverized in this process, the aluminum powder is mixed with the cathode active material powder and acts as a cause of increasing the content of aluminum impurities in the subsequent process. The selected cathode active material is dissolved in sulfuric acid to dissolve various metals, and then the solid content is discarded through a filtering process, and only the filtered solution is recovered. Caustic soda and hydrogen peroxide are added to the filtered solution to adjust the pH to slightly acidic to precipitate and remove impurities such as iron and aluminum in the form of hydrates, and in this process, aluminum removal efficiency is low, raising many problems. After removing impurities such as iron and aluminum, excess sodium hydroxide is added to precipitate and recover only cobalt, manganese, and nickel in the form of hydroxide, and the remaining sodium hydroxide is washed and purified. Refined cobalt hydroxide, manganese hydroxide, and nickel hydroxide are calcined and regenerated as cathode active materials. Lithium is reprocessed in a separate process to precipitate in the form of lithium carbonate by injecting high-pressure carbon dioxide.

Recently, waste secondary batteries have been discharged in large quantities, and recycling of waste cathode active materials is the most profitable among them, so reprocessing processes are being developed, but substances that can replace sulfuric acid have not been developed. Therefore, it is processed without considering environmental hazards rather than eco-friendly methods.

LITERATURES OF THE RELATED ART

Patent Literature
  (Patent Literature 0001) Korean Patent Application Laid-open Publication No. 10-2019-0123524 (published date: 2019.11. 01)

SUMMARY OF THE INVENTION

The present disclosure is intended to solve the problems of the related art as described above. An objective of the present disclosure is to provide a method for regenerating waste cathode active material through an eco-friendly method that can use non-hazardous materials and simplify the process in consideration of worker safety compared to conventional technology.

In order to achieve the above technical problem, the present disclosure provides a method for regenerating a waste secondary battery cathode active material, the method including: (a) dissolving the metal component included in the waste cathode active material including 50% to 90% by weight of manganese (Mn) based on the total weight of the metal component including lithium (Li), cobalt (Co), manganese (Mn), and nickel (Ni) in lactic acid and filtering to obtain a filtrate from which a solid is removed; (b) manufacturing a filtrate having a predetermined metal molar ratio by removing excess metal based on a predetermined metal molar ratio from the filtrate and adding an insufficient metal based on the predetermined metal molar ratio to the filtrate; and (c) synthesizing a cathode active material by removing solvent and lactic acid from the filtrate having a predetermined metal molar ratio and calcining.

In addition, in the step (a), the waste cathode active material is obtained by calcining a mixture including aluminum (Al) derived from a cathode current collector and a cathode active material and includes aluminum oxide and a metal included in the waste cathode active material is dissolved in lactic acid and filtered to obtain a filtrate from which a solid including aluminum oxide is removed.

In addition, in the step (b), excess metal ions based on a predetermined metal molar ratio are recrystallized through heating and cooling of the filtrate, separated and removed, and metal ions insufficient based on the predetermined metal molar ratio are added to the filtrate to prepare a metal ion solution.

In addition, in the step (b), 10 parts by weight of the waste cathode active material was mixed with 100 parts by weight of a 50% lactic acid solution, saturated dissolved at room temperature, filtered to a particle size of 10 μm or less, and the obtained filtrate was boiled and cooled to 10° C. or less to recrystallize only manganese compound, and the recrystallized manganese compound is removed, thereby selectively separating only manganese as an excess metal in the filtrate.

In addition, in the method, a metal precursor compound including at least one metal selected from the group consisting of lithium (Li), cobalt (Co), manganese (Mn), and nickel (Ni) as a metal insufficient based on a predetermined metal mole ratio is added to the filtrate separated and removed by manganese.

In addition, the metal precursor compound may include at least one selected from the group consisting of a lithium compound including lithium hydroxide, lithium nitrate, lithium oxide, lithium sulfate, and lithium chloride; a cobalt compound including cobalt oxide, cobalt nitrate, cobalt oxide, cobalt sulfate, and cobalt chloride; a manganese compound including manganese hydroxide, manganese nitrate, manganese oxide, manganese sulfate, and manganese chloride; and a nickel compound including nickel hydroxide, nickel nitrate, nickel oxide, nickel sulfate, and nickel chloride.

In addition, in the step (c), the metal ion solution is decompressed at 150° C. to 1 Pa to distill and remove residual solvent and lactic acid, and the remaining solid is calcined at 600° C. to 1200° C. to synthesize a cathode active material.

According to the method for regenerating waste secondary battery cathode active material of the present disclosure, by using lactic acid, which is an eco-friendly organic acid, instead of using a dangerous strong acid such as sulfuric acid, to dissolve the waste cathode active material, the safety of a worker is ensured, and the risk is low even when leaked to a natural system due to an accident.

In addition, since waste cathode active materials can be oxidized to remove particulate aluminum and removed only with a filter, it is economical and has excellent removal efficiency compared to the existing precipitate process by pH adjustment.

In addition, by selectively precipitating-removing only high-concentration manganese to recombine the ratio of lithium, cobalt, nickel, and manganese, the cathode active material regeneration process is simplified, hence reducing production costs.

In addition, since the cathode active material and unreacted lactic acid are recovered and recycled through reduced pressure-heating, there is no need for a process of neutralizing lactic acid, thereby simplifying the process. By calcining immediately after heating under reduced pressure to regenerate the cathode active material, there is no need to use an excessive number of alkaline substances, such as caustic soda, to neutralize sulfuric acid. Since there is no alkaline material use process, the washing process is unnecessary, and wastewater is not generated.

DESCRIPTION OF THE PREFERRED EMBODIMENTS

Figure 1:
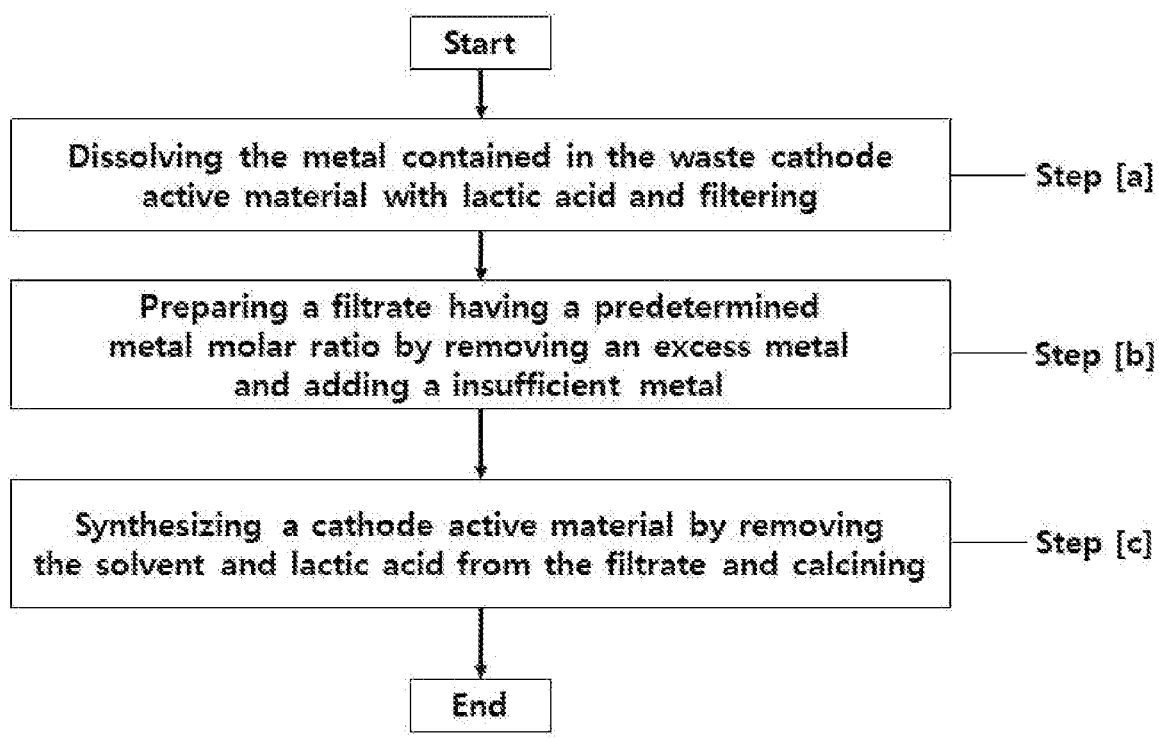
FIG. 1 is a process flow chart sequentially describing each step of an eco-friendly regenerating method of a cathode active material for a waste secondary battery using lactic acid according to the present disclosure.
Figure 2:
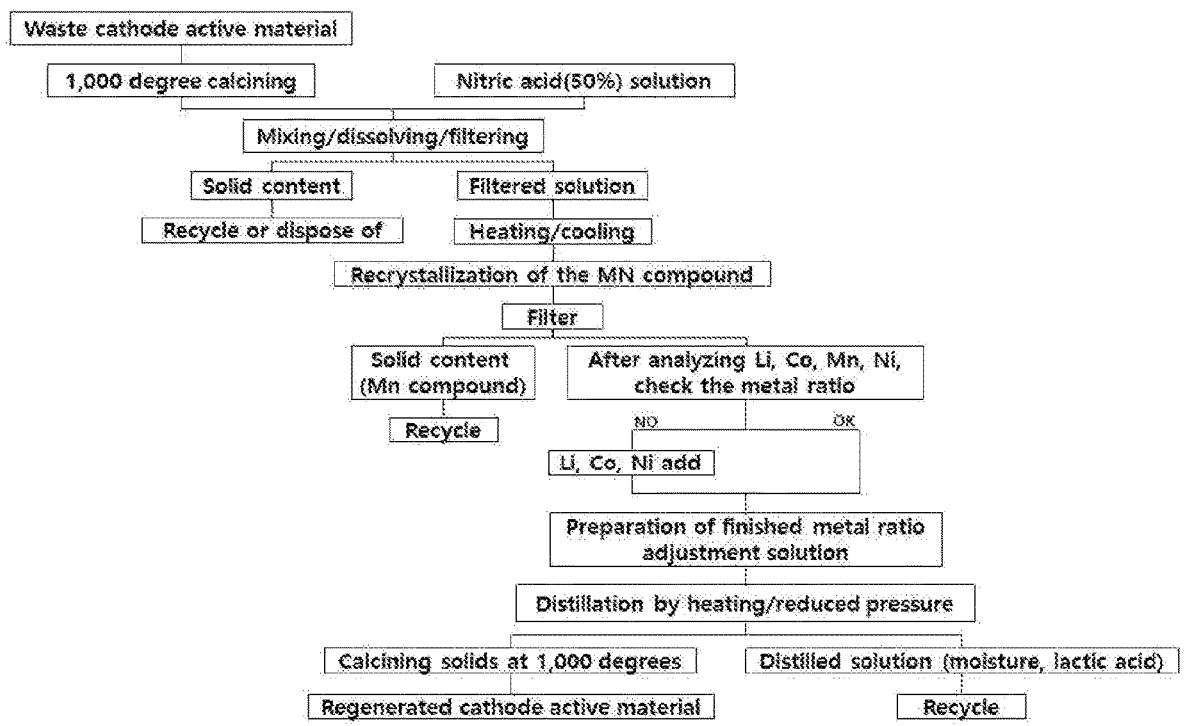
FIG. 2 is a process flow chart sequentially describing each step of regenerating the cathode active material by selectively reducing only manganese from the waste cathode active material containing a high concentration of manganese in the present embodiment.

In describing the present disclosure, well-known functions or constructions will not be described in detail when it is determined that they may obscure the gist of the present disclosure.

Since the embodiment, according to the concept of the present disclosure, may have various changes and may have various forms, specific embodiments will be illustrated in the drawings and described in detail in the present specification or application. However, this is not intended to limit the embodiment according to the concept of the present disclosure to a specific disclosed form and should be understood to include all changes, equivalents, or substitutes included in the spirit and scope of the present disclosure.

The terms used herein are used only to describe specific embodiments, and are not intended to limit the present disclosure. The singular expression includes the plural expression unless the context clearly dictates otherwise. In this specification, the term "include" or "have" should be understood to designate that one or more of the described features, numbers, steps, operations, components, or a combination thereof exist, and the possibility of addition of one or more other features or numbers, operations, components, or combinations thereof should not be excluded in advance.

Recently generated waste secondary batteries are those manufactured 20 years ago, and most of them contain lithium, cobalt, manganese, and nickel metals as main components, and carbon is included to impart conductivity. When looking at the ratio of metal components in the waste cathode active material currently generated, more than 50% of the total metal content is composed of manganese, whereas the cathode active materials of the secondary battery manufactured recently are composed of manganese content of less than 50% of the total metal content. Therefore, in the present disclosure, a technology capable of recombination by selectively reducing only manganese was developed.

The present disclosure includes: (a) dissolving the metal component included in the waste cathode active material, including 50% to 90% weight of manganese (Mn) based on the total weight of the metal component, including lithium (Li), cobalt (Co), manganese (Mn), and nickel (Ni) in lactic acid and filtering to obtain a filtrate from which a solid is removed; (b) manufacturing a filtrate having a predetermined metal molar ratio by removing excess metal based on a predetermined metal molar ratio from the filtrate and adding an insufficient metal based on the predetermined metal molar ratio to the filtrate; and (c) synthesizing a cathode active material by removing solvent and lactic acid from the filtrate having a predetermined metal molar ratio and calcining;

In the step (a), first, the waste cathode active material containing a high concentration of manganese is calcined in an air atmosphere at 800° C. to 1200° C.

At a temperature below 800° C., it is difficult to burn carbon contained in the waste cathode active material and remove the carbon, and it is impossible to oxidize the aluminum particles included in the waste cathode active material to form aluminum oxide by flowing in from the aluminum current collector coated with the cathode active material. If aluminum particles are not oxidized and synthesized in the form of aluminum oxide, the aluminum cannot be removed through a filter in the next process.

When the temperature exceeds 1200° C., there is a problem of not being melted in the next process due to a melting phenomenon between carbon particles and metal particles, and also a problem of increasing economic costs due to high energy consumption.

In particular, aluminum acting as an impurity is melted at 660° C. and combined with oxygen at 800° C. or higher to synthesize aluminum oxide. Aluminum oxide is insoluble in organic acids such as lactic acid, so when dissolving the cathode active material with lactic acid in a subsequent process, aluminum oxide exists in a precipitated state without being dissolved and can be easily removed through a filter process (Formula (1) below). This technology does not require the step of dissolving the cathode active material in sulfuric acid to precipitate and remove the existing aluminum, adjusting the pH to weak acid to precipitate in the form of aluminum hydroxide, and then filtering again (Formula (2) below).

$$2Al + 3O_2 \rightarrow Al_2O_3 \text{ (removed by filtering)} \qquad (1)$$

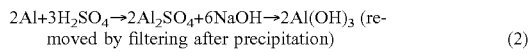

$$2Al + 3H_2SO_4 \rightarrow 2Al_2SO_4 + 6NaOH \rightarrow 2Al(OH)_3 \text{ (removed by filtering after precipitation)} \qquad (2)$$

Subsequently, the calcined waste cathode active material is added with an excessive amount of lactic acid solution (50%) and dissolved, and then filtered. 5 to 10 parts by weight of the calcined waste cathode active materials are added to 100 parts by weight of lactic acid solution (50%) and stirred for 24 hours to make a saturated solution and filtered with a filter of 10 μm or less to separate the filter solution and the solid. The solid material can be mixed with the calcined waste cathode active material and dissolved again in lactic acid (50%) solution. When the calcined waste cathode active material is added at less than 5 parts by weight compared to 100 parts by weight of lactic acid solution, the saturated solution may not be prepared, and thus unreacted lactic acid remains, and when the amount of the waste cathode active material is more than 10 parts by weight, the filter efficiency is low due to severe clogging.

Next, in the step (b), based on a predetermined metal molar ratio determined according to the metal molar ratio in the cathode active material to be finally synthesized through the regeneration method according to the present disclosure, the filtrate having a predetermined metal molar ratio is prepared by removing excess metal such as manganese from the filtrate and adding insufficient metal to the filtrate.

For example, after boiling the filtrate, the boiled filtrate is cooled, and a manganese lactic acid crystal is selectively prepared during the cooling process. When the filtrate is heated to 100° C., metal ions dissolved by lactic acid combine with lactic acid to form crystals of manganese lactate. Although crystals of manganese lactic acid are not formed without heating, when synthesized with manganese lactic acid through a heating process and cooled to 10° C. or less, the supersaturated manganese lactic acid is recrystallized and precipitated. Only manganese dissolved in high concentrations can be selectively precipitated in this process. The recrystallized manganese lactate is filtered again, and the filtrate is analyzed to analyze the concentrations of lithium, cobalt, manganese, and nickel. When the concentration of manganese is high, heating and cooling are repeatedly performed to recrystallize and remove the manganese compound, and when the concentration of manganese is low, the recrystallized manganese lactic acid is added according to the combination ratio and dissolved to form a desired metal ratio.

Furthermore, one compound among lithium nitrate, cobalt nitrate, and nickel nitrate can be added according to a specific metal combination ratio and adjusted to a desired ratio in order to increase the concentration of a particular metal among lithium, cobalt, and nickel.

Subsequently, in step (c), the filtrate having a predetermined metal molar ratio obtained through step (b) may be decompressed while heating to distill and remove moisture as a solvent and unreacted lactic acid. Unreacted lactic acid is distilled by decompression to 1 Pa or less at 120° C. to 250° C. In this way, by using heat-decompression distillation, all of the water and unreacted lactic acid are removed to recover only the solid content. When the decompression-distillation temperature is below 120° C., moisture is distilled, but unreacted lactic acid is not distilled, and when the decompression-distillation temperature exceeds 200° C., moisture is distilled, but unreacted lactic acid is carbonized and cannot be recycled. The decompression has a problem in that the efficiency of lactic acid distillation is rapidly reduced when the pressure is higher than 1 Pa.

Next, moisture and lactic acid are distilled off, and the remaining residue is calcined at 600° C. to 1200° C. to synthesize a cathode active material. Before calcination, all metals exist as lactic acid compounds. While applying heat, the lactic acid compound is decomposed, and lithium, cobalt, and nickel are re-synthesized to synthesize a cathode active material in the form of lithium-nickel-cobalt oxide or lithium-cobalt-manganese oxide. When the heating temperature is less than 600° C., metal materials are thermally decomposed when they are combined with lactic acid. Metal materials exist only in each oxide form, and also, as there is no intermetallic bonding force, the crystalline function as a cathode active material is not manifested. When the heating temperature exceeds 1200° C., crystalline structures having an intermetallic bonding force are melted, and thus the crystallinity is lost, and the function of the cathode active material is lost.

Compared to the conventional synthesis method, this synthesis method has a simpler process and less risk by using lactic acid, which is an organic acid and can be easily recovered and recycled by distilling unreacted lactic acid. In addition, this method can be said to be an eco-friendly method that does not generate wastewater because that method does not use a separate alkaline substance to neutralize lactic acid and does not use washing water for purification.

Hereinafter, the embodiments of the present disclosure will be described in more detail by way of examples.

Examples disclosed in the present disclosure can be modified into various other forms, and the scope of the present disclosure is not construed as being limited to the examples described below. The embodiments of the present specification are provided to more completely explain the present specification to those of ordinary skilled in the art.

Example 1

10 g of waste cathode active material was put in an electric furnace, the sample was dissolved and saturated in lactic acid before calcining at 1000° C. for 1 hour, filtered with a glass fiber filter (GF/C), and the aluminum concentration was analyzed. In the solution filtered by dissolving the sample in lactic acid before calcining, aluminum was 879 mg/kg, and in the solution filtered by dissolving in lactic acid after calcining, aluminum was 17.9 mg/kg. As a result, the aluminum component contained in the non-calcined sample was easily dissolved in lactic acid and easily passed through a glass fiber filter paper, and the aluminum component contained in the calcined sample was changed to an aluminum oxide particle, which was not dissolved in lactic acid during the calcining process, and thus could not pass through the glass fiber filter paper.

Example 2

200 g of the waste cathode active material was calcined at 1000° C. for 1 hour and cooled, and lactic acid (90%) was diluted with distilled water to prepare 1 L of a 50% solution. All of the calcined waste cathode active material was added to lactic acid and dissolved by stirring at room temperature for 24 hours and then filtered through a glass fiber filter paper (GF/C). As a result of analyzing the main metal components with an inductively coupled plasma spectrometer, cobalt was 1,474 ppm, lithium was 2,997 ppm, manganese was 9,273 ppm, and nickel was 3,453 ppm, the approximate weight ratio of cobalt:lithium:manganese:nickel=1:2.03:6.3:2.34. The filtered solution was heated and boiled for 10 minutes, then cooled to 10° C. and stored for 48 hours. Pink crystalline materials were precipitated in the solution, As a result of analyzing them with an X-ray fluorescence analyzer, the main component was analyzed as manganese, and as a result of analyzing them with an X-ray diffraction analyzer, manganese lactate was found.

After filtering the crystalline material again with glass fiber filter paper (GF/C), the filtered solution was analyzed for major metal components with an inductively coupled plasma spectrometer. As a result, cobalt was 1,403 ppm, lithium was 2,860 ppm, manganese was 3,409 ppm, and nickel was 3,358 ppm, and the approximate weight ratio of cobalt:lithium:manganese:nickel=1:2.04:2.43:2.39. As such, only manganese was selectively recrystallized and removed.

Example 3

In order to produce a recombination of cobalt:lithium:manganese:nickel=1:2:2:2 by weight ratio of the cathode active material metals, 0.75 g of cobalt nitrate hexahydrate and 0.95 g of lithium hydroxide were added to 500 ml of a filtered solution from which a part of manganese was recrystallized and removed in Example 2 and dissolved. As a result of analyzing the main metal components of the dissolved solution with an inductively coupled plasma spectrometer, cobalt was 1,728 ppm, lithium was 3,426 ppm, manganese was 3,472 ppm, and nickel was 3,385 ppm, the approximate weight ratio of cobalt:lithium:manganese:nickel=1:1.98:2.01:1.96. In this way, it was possible to prepare a solution composed of the initially designed metal ratio.

Example 4

300 ml of a solution composed of the metal ratio designed in Example 3 was put into a 1L round bottom flask and heated while decompressing to 1 to 2 Pa in a heating mantle. Moisture and lactic acid were completely distilled off, and the solids remaining without being distilled in the round bottom flask were placed in an electric furnace and calcined at 1000° C. for 1 hour. As a result of analyzing the calcined material with an X-ray diffraction analyzer, it was possible to synthesize the material with the same crystal structure as the recently marketed cathode active material.

The cathode active material regenerated according to the present disclosure was put into nitric acid and melted with a microwave melting device, and then, as a result of analyzing the main metal components with an inductively coupled plasma spectrometer, 8.56% of cobalt, 17.4% of lithium, 18.1% of manganese, and 17.2% of nickel were found. The total weight of the metal components synthesized according to the present disclosure accounted for 61.26% of the cathode active material. As such, as the weight ratio of cobalt:lithium:manganese:nickel=1:2.03:2.11:2.01, a cathode active material produced with an initially designed metal composition ratio can be synthesized.

While exemplary embodiments of the present disclosure have been described with reference to the accompanying drawings, those skilled in the art will appreciate that the present disclosure can be implemented in other different forms without departing from the technical spirit or essential characteristics of the present disclosure. Therefore, it can be understood that the examples described above are only for illustrative purposes and are not restrictive in all aspects.

What is claimed is:

1. A method for regenerating a cathode active material of a waste secondary battery, the method comprising:
   (a) dissolving a metal component comprised in a waste cathode active material comprising 50% to 90% by weight of manganese (Mn) based on the total weight of the metal component comprising lithium (Li), cobalt (Co), manganese (Mn), and nickel (Ni) in lactic acid and filtering to obtain a filtrate from which a solid is removed;
   (b) manufacturing a filtrate having a predetermined metal molar ratio by removing excess metal based on the predetermined metal molar ratio from the filtrate and adding an insufficient metal based on the predetermined metal molar ratio to the filtrate; and (c) synthesizing a cathode active material by removing solvent and lactic acid from the filtrate having the predetermined metal molar ratio and calcining, wherein in the step (b), excess metal ions based on the predetermined metal molar ratio are recrystallized through heating and cooling of the filtrate, separated and removed, and insufficient metal ions based on the predetermined metal molar ratio are added to the filtrate to prepare a metal ion solution having the predetermined metal molar ratio.

2. The method of claim 1, wherein in a step (a), the waste cathode active material is obtained by calcining a mixture comprising aluminum (Al) derived from a cathode current collector and a cathode active material and comprises aluminum oxide, and a metal comprised in the waste cathode active material is dissolved in lactic acid and filtered to obtain the filtrate from which a solid containing aluminum oxide is removed.

3. The method of claim 1, wherein in the step (b), 10 parts by weight of the waste cathode active material is mixed with 100 parts by weight of a 50% lactic acid solution, saturated and dissolved at room temperature, filtered to a particle size of 10 μm or less, and the obtained filtrate is boiled and cooled to 10° C. or less to recrystallize only manganese compound, and the recrystallized manganese compound is removed, thereby selectively separating only manganese as an excess metal in the filtrate.

4. The method of claim 3, wherein a metal precursor compound comprising at least one metal selected from the group consisting of lithium (Li), cobalt (Co), manganese (Mn), and nickel (Ni) as a metal insufficient based on a predetermined metal mole ratio is added to the filtrate from which the above manganese was separated and removed.

5. The method of claim 4, wherein the metal precursor compound comprises at least one selected from the group consisting of a lithium compound comprising lithium hydroxide, lithium nitrate, lithium oxide, lithium sulfate, and lithium chloride;

a cobalt compound comprising cobalt oxide, cobalt nitrate, cobalt oxide, cobalt sulfate, and cobalt chloride; a manganese compound comprising manganese hydroxide, manganese nitrate, manganese oxide, manganese sulfate, and manganese chloride; and a nickel compound comprising nickel hydroxide, nickel nitrate, nickel oxide, nickel sulfate, and nickel chloride.

6. The method of claim 1, wherein in the step (c), the metal ion solution is decompressed to 1 Pa at 150° C. to distill and remove residual solvent and lactic acid, and the remaining solid is calcined at 600° C. to 1200° C. to synthesize the cathode active material.

* * * * *